United States Patent [19]

Mansfield et al.

[11] Patent Number: 5,201,610
[45] Date of Patent: Apr. 13, 1993

[54] GROUT BAG DEPLOYMENT PALLET

[75] Inventors: Steven E. Mansfield, Houston, Tex.; Neil A. Stagg, Tinamba, Australia

[73] Assignee: Diverless Systems, Inc., Houston, Tex.

[21] Appl. No.: 651,763

[22] Filed: Feb. 7, 1991

[51] Int. Cl.$^5$ .............................................. F16L 1/04
[52] U.S. Cl. ............................... 405/172; 405/158; 405/191
[58] Field of Search ............... 405/158, 172, 154, 223, 405/222, 303, 204, 191

[56] References Cited

U.S. PATENT DOCUMENTS

| | | | |
|---|---|---|---|
| 4,352,590 | 10/1982 | Parker et al. | 405/17 |
| 4,363,569 | 12/1982 | Scodino et al. | 405/158 X |
| 4,693,632 | 9/1987 | Ingersoll | 405/18 |

FOREIGN PATENT DOCUMENTS

| | | | |
|---|---|---|---|
| 1099171 | 6/1984 | U.S.S.R. | 405/158 |
| 2015115 | 9/1979 | United Kingdom | 405/158 |
| 2036917 | 7/1980 | United Kingdom | 405/158 |
| 2187436B | 12/1989 | United Kingdom | |

OTHER PUBLICATIONS

"Remote Operated Placing System", published by Canflex Manufacturing, Inc., West Vancouver, B.C. Canada (4 pages, no date).
"Your Partner Offshore for Fabric Formwork and Grouting", published by Canflex Manufacturing, Inc., West Vancouver, B.C. Canada (5 pages, no date).
"Fabric Formwork Grouting Offshore", published by Canflex Manufacturing, Inc., West Vancouver, B.C. Canada (10 pages (excerpted), no date).
"Style '88' Pipeline Grout Support Bags", published by Canflex Manufacturing, Inc., West Vancouver, B.C. Canada (14 pages (excerpted), no date).
"General Information on Pipeline Stabilization and Protection", published by Wimpey Geotech Limited, Hayes, Middlesex, England (10 pages (excerpted), no date).

*Primary Examiner*—Dennis L. Taylor
*Attorney, Agent, or Firm*—Pravel, Gambrell, Hewitt, Kimball & Krieger

[57] ABSTRACT

An apparatus and method for placement and deployment of grout bags which, when deployed by filling with grout, act as supports for subsea pipelines or structures. The apparatus includes a pallet to which a collapsed grout bag is attached for placement, an alignment member, and a manifold assembly for distributing grout to multiple bags or compartments. The alignment member is abutted against the subsea pipeline or structure to assure proper placement of the grout bag beneath the pipeline or structure. The pallet base structure permits level deployment of the pallet on sloping seabeds. The pallet base structure includes legs and brace members which are specially designed to suit the seabed conditions at the installation site. The length of the pallet legs depends upon the relative softness of the seabed, with longer legs providing frictional support as they embed themselves into the seabed. Short legs provide support for the pallet on relatively hard seabeds by resting on the seabed with minimal embedding. The pallet brace members embed in the seabed to provide resistance to lateral loads and enhance the frictional support provided by the pallet legs. The bottom surface of the pallet brace members is angled to match the slope of the seabed at the installation location. The brace members embed in the seabed to a uniform depth while maintaining the pallet in a horizontal attitude.

8 Claims, 8 Drawing Sheets

GROUT BAG DEPLOYMENT PALLET

BACKGROUND OF THE INVENTION

1. Field of the Invention

The invention generally relates to underwater pipelines, and more particularly, to stabilizing elevated pipelines after installation using grout bags for forming pedestals.

2. Description of the Related Art

Subsea pipelines or structures supported on the seabed often require the underwater construction of pedestals or sleepers where the pipeline would otherwise be unsupported for a given length. Construction of these supports requires both accurate placement of the support under the pipeline or structure, and the flexibility to adapt the support to various seabed conditions. In many cases the use of divers in the construction process is infeasible and operations must be conducted entirely by remote means. Under these circumstances a highly reliable and accurate means of support placement is particularly important.

One support construction technique involves the placement of collapsed bags beneath the pipeline or structure. The bags are then filled with grout until they rest on the seabed and support the pipeline or structure. Existing methods of grout bag placement require manual placement by visual means or attachment of the placement apparatus to the pipeline or structure.

Bag placement is generally slow and imprecise if done using remotely operated vehicles (ROV's). Attachment of the placement apparatus to the pipeline or structure imposes undesirable loads on the pipe or structure, may damage the pipe or structure, and makes accurate bag placement difficult for sloping pipelines or structures. In addition, existing bag placement methods and apparatus do not adequately compensate for a sloping seabed.

Therefore, there is a need for an apparatus which can be easily located remotely, does not attach to the pipeline, and can be used on sloping seabeds.

SUMMARY OF THE INVENTION

The present invention is directed to the remote installation of supports for subsea pipelines or structures. The supports are constructed by placing collapsed bags beneath the pipeline or structure and filling the bags with grout. A pallet for placement on the seabed has attached a collapsed grout bag. A pallet alignment member or frame is attached to the pallet to assist in positioning the pallet and grout bag adjacent to the pipeline or structure to be supported. The pallet alignment member also provides a cable attachment point and support for the pallet and grout bag during the descent to the seabed. A grout bag deployment manifold assembly provides a means of sequentially filling the individual compartments of multi-compartment grout bags.

The pallet alignment member is located with respect to the pallet and the grout bag so that when the pallet alignment member contacts the pipeline the grout bag is centered below the pipeline. As the grout bag fills, it expands to reach up to the pipeline. By having the pallet alignment member located so that the grout bag is centered, the chances of a misaligned grout bag are greatly reduced. The contact of the pallet alignment member with the pipeline simplifies deployment because of the simple, automatic registration provided. Simply have the pallet alignment member contact the pipeline and everything is aligned.

The pallet alignment member can be removed after the pallet and grout bag are located, thus removing obstacles and potential hazards to the pipeline should the pallet shift.

For essentially horizontal seabed applications the pallet size is only that required to hold the grout bag for alignment. In sloped seabed applications the pallet is preferably formed of multiple separate elements. The elements have a planar top surface for receiving the grout bag, one element holding the collapsed grout bag, and a sloped bottom surface designed to match the seabed slopes so that the planar grout bag surface is horizontal. In this way the grout bag surface can remain horizontal for proper filling and stability and yet pedestals can be provided on sloped surfaces.

BRIEF DESCRIPTION OF THE DRAWINGS

A better understanding of the present invention can be had when the following detailed description of the preferred embodiment is considered in conjunction with the following drawings, in which.

DESCRIPTION OF THE PREFERRED EMBODIMENTS

While the present invention will be described in connection with construction operations conducted by remote operated vehicle (ROV), it is understood that the present invention may be used in conjunction with other means of conducting construction operations.

Figure 1:
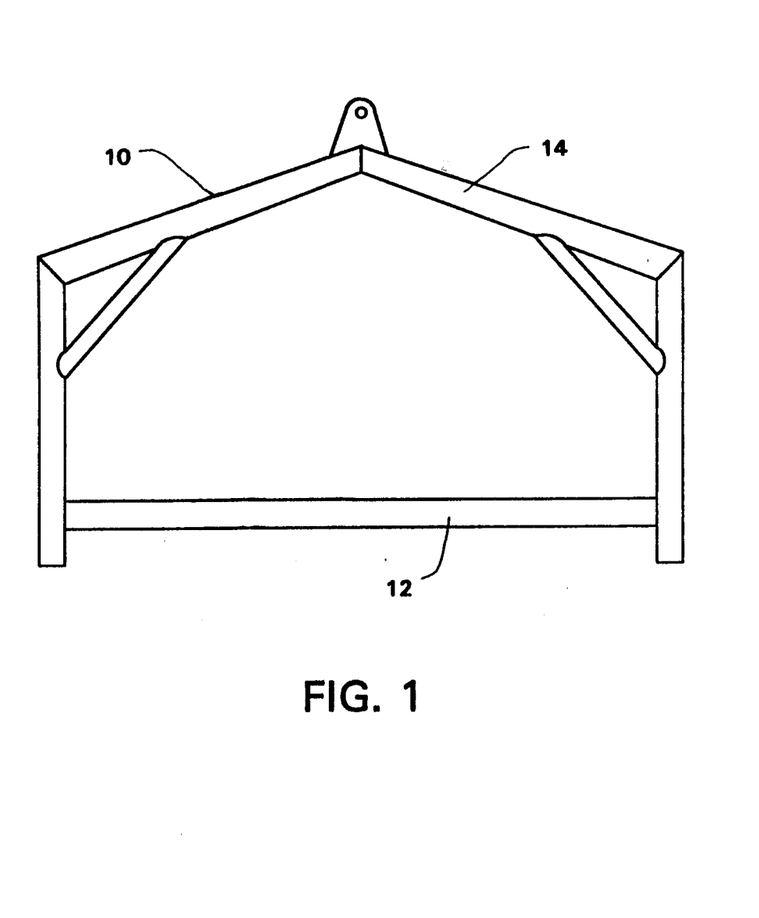
FIGS. 1 and 2 are front and side elevation views, respectively, of one embodiment of a grout bag deployment pallet assembly according to the present invention.

Referring now to FIG. 1, the reference numeral 10 generally indicates a one-piece grout bag deployment pallet assembly according to the present invention. This embodiment is suitable for grout bag deployment on a relatively flat seabed. The grout bag deployment pallet assembly 10 includes a pallet 12 and a pallet alignment member or frame 14. In this embodiment the pallet 12 is constructed of steel beams and channels and expanded steel grating, and the pallet alignment member 14 is constructed of steel pipe. The grout bag (not shown) is placed on the pallet 12. The width of the pallet 12 is preferably approximately ¼ the width of the grout bag, while the length of the pallet 12 is preferably approximately equal to the length of the grout bag. The height of the pallet alignment member 14 is as necessary based on the distance between the pipeline and the seabed, as will be described.

Figure 2:
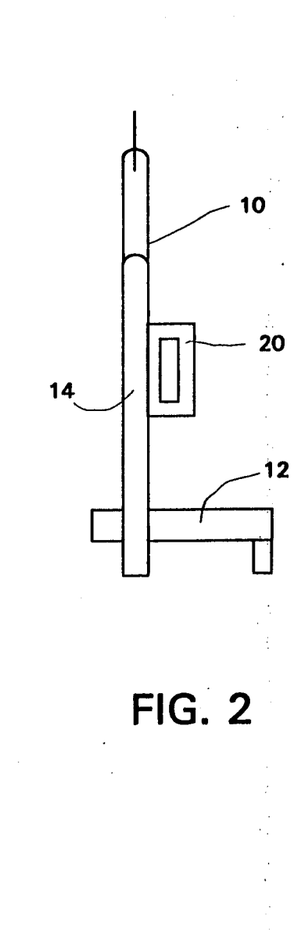
Figure 3:
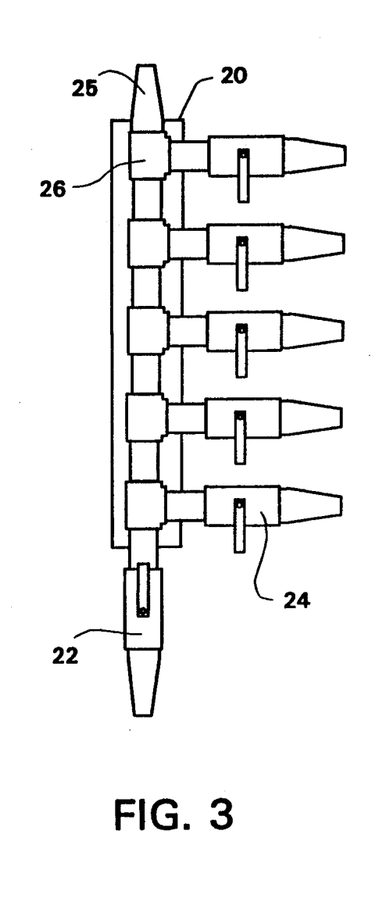
FIG. 3 is a side view of a grout bag deployment manifold assembly.

Referring now to FIG. 2, the grout bag deployment pallet assembly 10 includes a deployment manifold assembly 20 (FIG. 3). The grout bag deployment manifold assembly 20 is comprised of a dump valve 22, deployment valves 24, inlet port connector 25, and a manifold 26. The manifold assembly 20 simplifies distribution of the grout into the preferred multi-compartment grout bag, but it is understood that single compartment grout bags may be utilized.

Referring now to FIGS. 4 through 7, the deployment sequence of a grout bag B on a seabed S to support a pipeline or structure P is illustrated. Prior to subsea deployment the grout bag B is attached to the pallet 12. The grout bag B is folded and aligned such that when expanded, the center line of the grout bag B is just beyond the pallet alignment member 14 away from the pallet 12. Grout injection conduits 29 are connected between the various compartments of the grout bag B and the deployment valves 24 of the grout bag deployment manifold assembly 20. A grout supply conduit 28 is also connected to the grout bag deployment manifold assembly 20 by means of the inlet port connector 25 to supply grout from a support vessel (not shown) on the surface. A deployment cable 16 is attached to the grout bag deployment pallet assembly 10 by means of the pallet alignment member 14.

Figure 4:
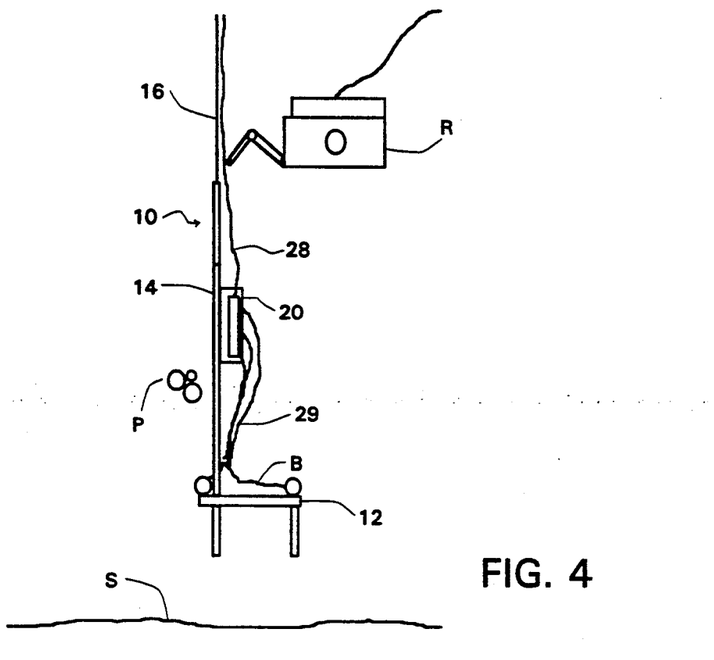
FIGS. 4 through 7 illustrate a grout bag deployment sequence employing the grout bag deployment pallet assembly of FIGS. 1 and 2.

Referring now to FIG. 4, the grout bag deployment pallet assembly 10 is lowered to the seabed by means of the deployment cable 16. The placement of the grout bag deployment pallet assembly 10 adjacent to the pipeline or structure P is supervised by the remote operated vehicle (ROV) R. The grout bag deployment pallet assembly 10 is accurately placed on the seabed S by means of the pallet alignment member 14 which is placed in contact with the pipeline or structure P. As noted, the grout bag B is folded and located on the pallet 12 such that when expanded, the center line of the grout bag B is beyond the pallet alignment member 14. Thus when the pallet alignment member 14 contacts the pipeline P, the grout bag B is automatically centered or registered with the pipeline P, thus greatly simplifying alignment. No trial and error or complicated remote positioning operations are necessary. The pallet alignment member 14 is sufficiently tall so that the pallet alignment member 14 stays in contact with the pipeline P from first contact until the assembly 10 is resting on the seabed S.

Figure 5:
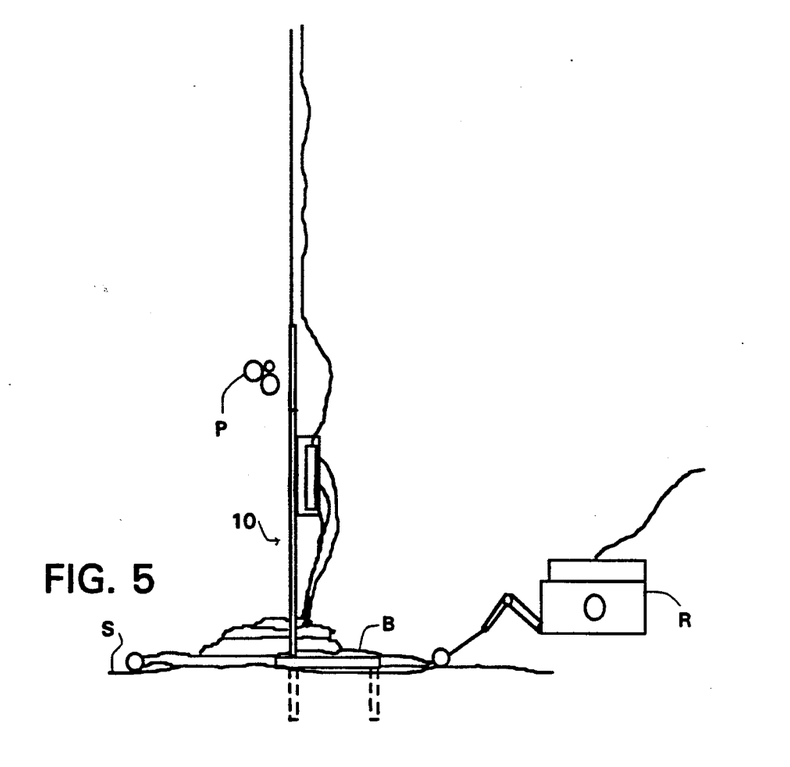

Referring now to FIG. 5, following placement of the grout bag deployment pallet assembly 10 on the seabed S, the empty grout bag B is unfolded or deployed on the seabed S by means of the ROV R.

Figure 6:
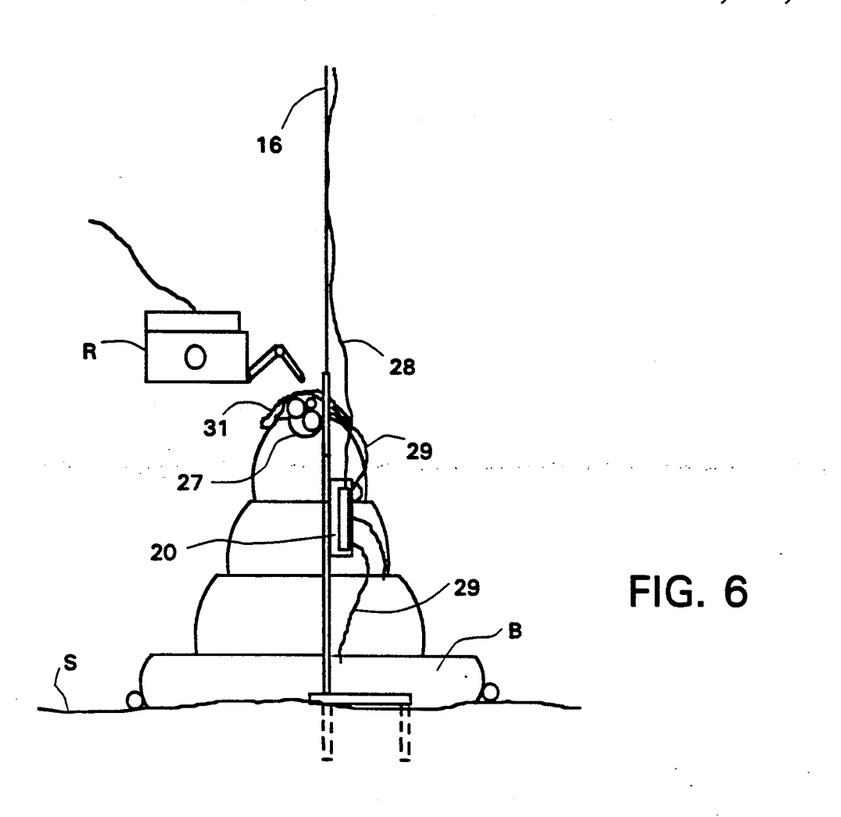

Referring now to FIG. 6, following verification of proper deployment of the grout bag B on the seabed S by means of the ROV R, the compartments of the grout bag B are sequentially filled with grout by means of the grout bag deployment manifold assembly 20. An exemplary filling of the grout bag compartments proceeds as follows. The dump valve 22 and the deployment valves 24 of the grout bag deployment manifold assembly 20 are manipulated by means of the ROV R. Initially, the dump valve 22 is in the open position and all deployment valves 24 are in the closed position. Pumping of grout from a high pressure grout source aboard a support vessel is then begun through the grout supply conduit 28. When grout is observed by the ROV R to be flowing through the dump valve 22, the deployment valve 24 which supplies grout to the base compartment of the grout bag B by means of the grout injection conduit 29 is opened by means of the ROV R. The dump valve 22 is then placed in the closed position by means of the ROV R. Once the ROV R has visually verified proper filling of the base compartment of the grout bag B, the dump valve 22 is re-opened. The deployment valve 24 which supplies the base compartment of the grout bag B is then placed in the closed position. This sequence is repeated until all compartments of the grout bag B are satisfactorily deployed. As can be seen in FIG. 6, which shows a filled grout bag B, the groove or recess 27 in the top portion of the grout bag B intended to receive the pipeline P is properly centered and positioned with respect to the pipeline P.

Figure 7:
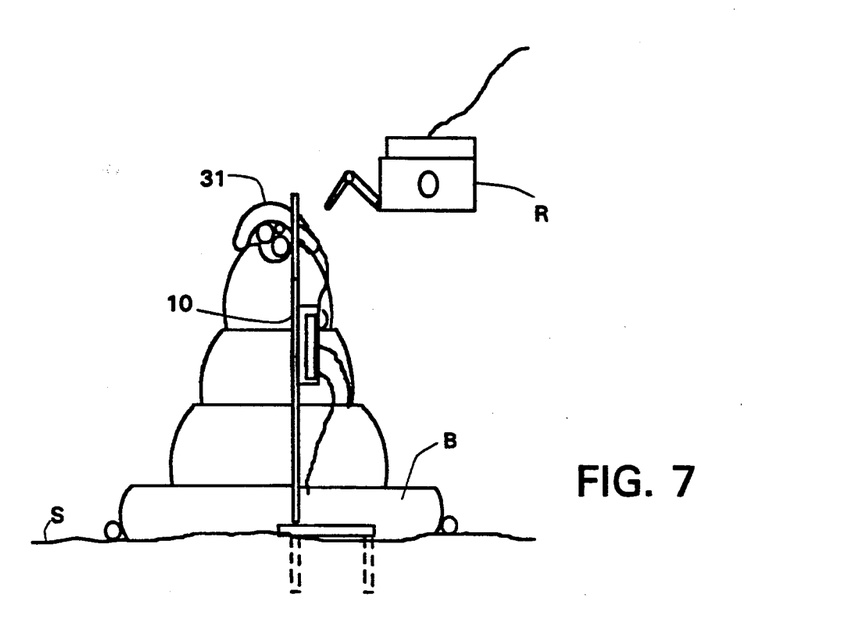

Referring now to FIG. 7, following verification of proper deployment of the grout bag B by the ROV R, including the deployment of a pillow bag 31 over the pipeline P to better secure the pipeline P to the grout bag B, the deployment cable 16 has been disconnected and returned to the surface. The grout bag deployment pallet assembly 10 remains on the seabed S. The grout in the filled grout bag B hardens, forming the desired support pedestal, the grout bag B having acted as a form during the hardening process.

Figure 8:
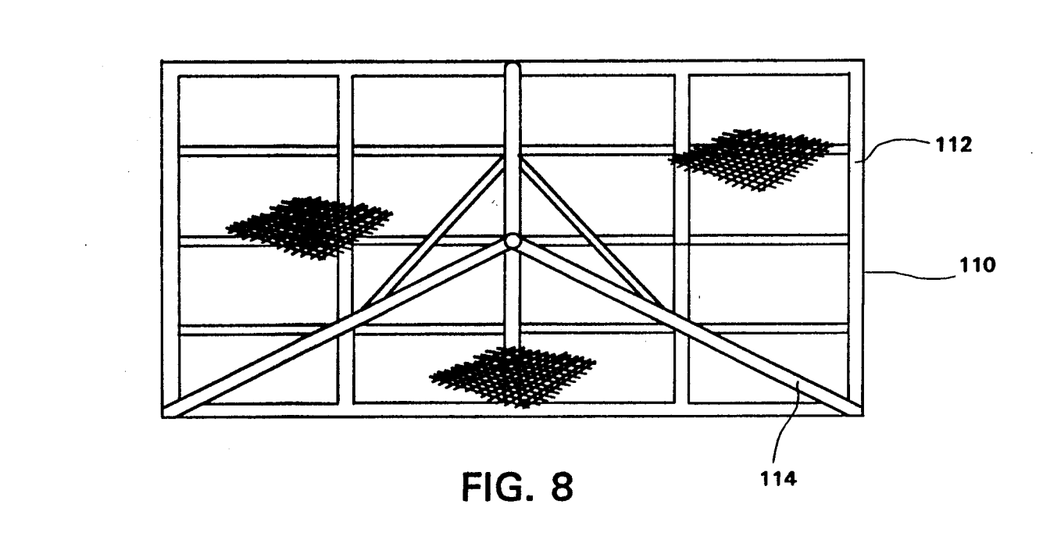
FIGS. 8 through 10 are plan, partial front elevation, and side elevation views, respectively, of another embodiment of a grout bag deployment pallet assembly according to the present invention.
Figure 9:
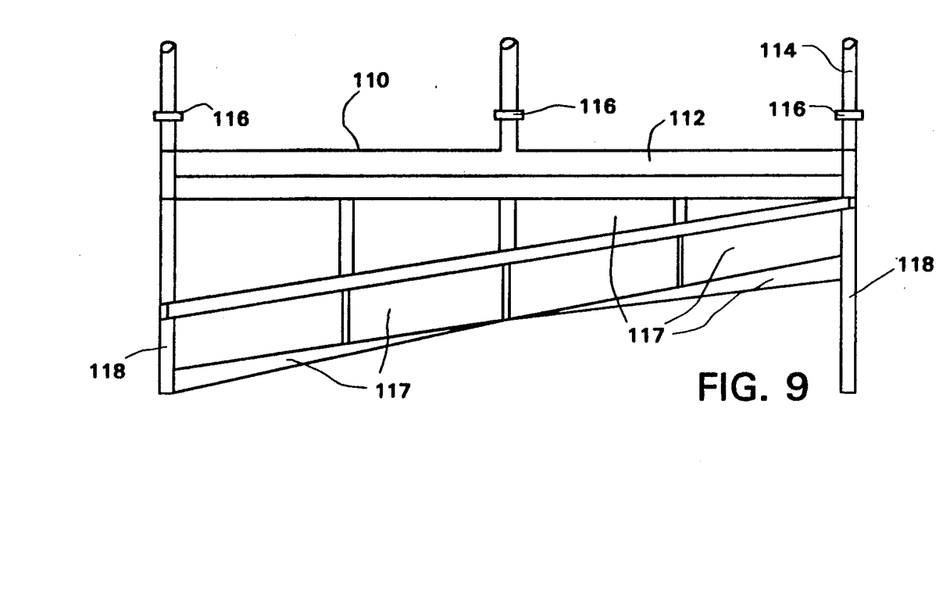
Figure 10:
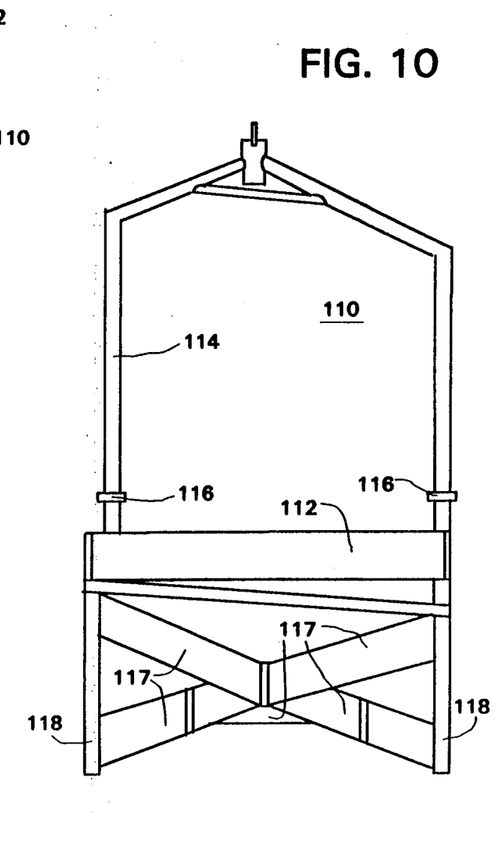

Referring now to FIGS. 8 through 10, one portion 110 of a two-portion grout bag deployment pallet assembly, is illustrated. Whereas the embodiment of FIGS. 1 and 2, the one-piece grout bag deployment pallet assembly 10, is suitable for grout bag deployment on a relatively flat seabed, the embodiment of FIGS. 8 through 10, the two-portion grout bag deployment pallet assembly, is capable of providing proper grout bag placement when sloping seabed conditions are encountered. The two-portion pallet assembly uses two similar portions, the differences between the portions being those necessary for the individual seabed variations, the storage of the folded grout bag B on only a single portion, and the inclusion of the grout bag deployment manifold on the storage portion. The two-portion grout bag deployment pallet portion 110 is comprised of the pallet 112 and the pallet alignment member 114. In this embodiment the pallet 112 is constructed of steel beams and channels, and expanded steel grating, and the pallet alignment member 114 is constructed of steel pipe.

While in the illustrated one-piece grout bag deployment pallet assembly 10 the pallet alignment member 14 was generally planar, the illustrated pallet alignment member 114 forms a tripod, attaching to the pallet 112 at three locations and meeting at a central point. Referring now to FIG. 9, the pallet alignment member 114 may be disconnected from the pallet 112 by opening a series of disconnect couplings 116. A similar coupling technique can be used with the one-piece grout bag deployment pallet assembly 10.

The pallet 112 is specially designed and constructed to compensate for the slope of the seabed at the anticipated placement location. The pallet brace members 117 are located beneath the top planar surface of pallet 112 and act to reinforce the structure of pallet 112 and to stabilize it on the seabed S. The reinforcing function of the pallet brace members 117 is achieved by interconnecting the pallet brace members and connecting them to the pallet legs 118. In this embodiment the pallet brace members 117 are constructed of steel plate and reinforcing steel channels and are arranged with their planar surfaces essentially normal to the top planar surface of pallet 112. The pallet brace members 117 partially embed themselves in the seabed S upon installation of the pallet 112 and are particularly effective for stabilizing the pallet 112 on soft, unconsolidated seabeds. The angle of the plane formed by the bottom surface of the pallet brace members 117 approximates the slope of the seabed on which the pallet 112 is to be installed. Because the pallet brace members 117 are angled to match the seabed slope, they embed themselves in the seabed to a uniform depth while the top surface of pallet 112 remains in a horizontal attitude. The pallet 112 is thus able to resist loads applied in any direction and remain in proper position. A pallet leg 118 extends vertically downward from the top planar surface of the pallet 112 at each of its corners. In this embodiment the pallet legs 118 are constructed of steel pipe. The pallet legs 118, like the pallet brace members 117, rest on and also partially embed themselves in the seabed upon installation of pallet 112. The length of the pallet legs 118 is determined by the seabed conditions at the installation site. For soft seabeds, relatively long pallet legs 118 are required to embed deeply in the seabed and support the pallet 112 by frictional resistance. For hard seabeds, relatively short pallet legs 118 may be employed to provide support to pallet 112 by merely resting on the seabed.

Figure 11:
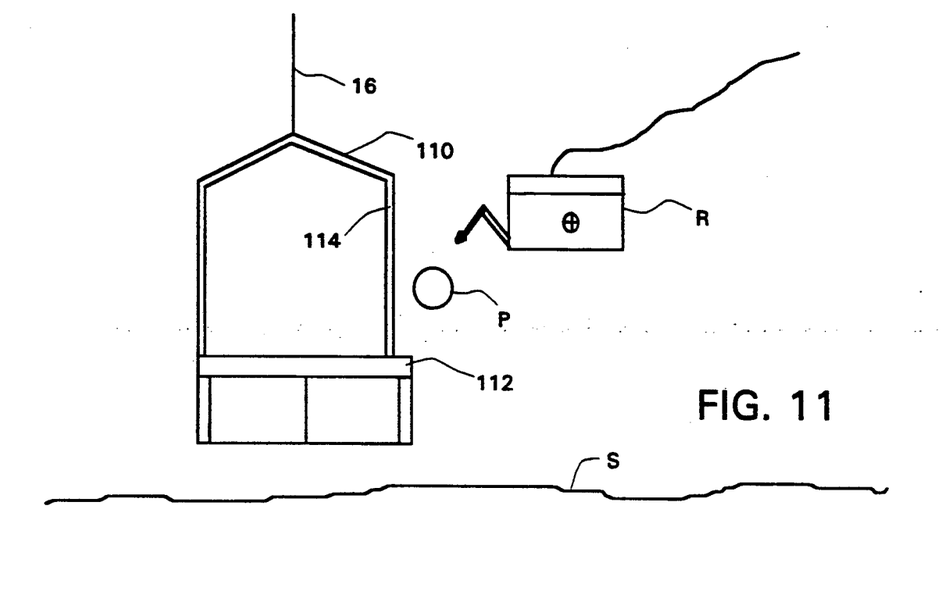
FIGS. 11 through 18 illustrate a grout bag deployment sequence employing the grout bag deployment pallet assembly of FIGS. 8-10.

FIGS. 11 through 18 illustrate the deployment sequence of a grout bag B on a sloping seabed S by means of a two-portion grout bag deployment pallet assembly. In FIG. 11, an empty portion 110 is lowered to the seabed S by means of deployment cable 16 attached to pallet alignment member 114. The placement of pallet 112 on the seabed S is supervised by the ROV R. Proper placement of the portion 110 adjacent to the pipeline P is insured when the pallet alignment member 114 abuts the pipeline P in a manner similar to that of the one-piece grout bag deployment pallet assembly 10.

Figure 12:
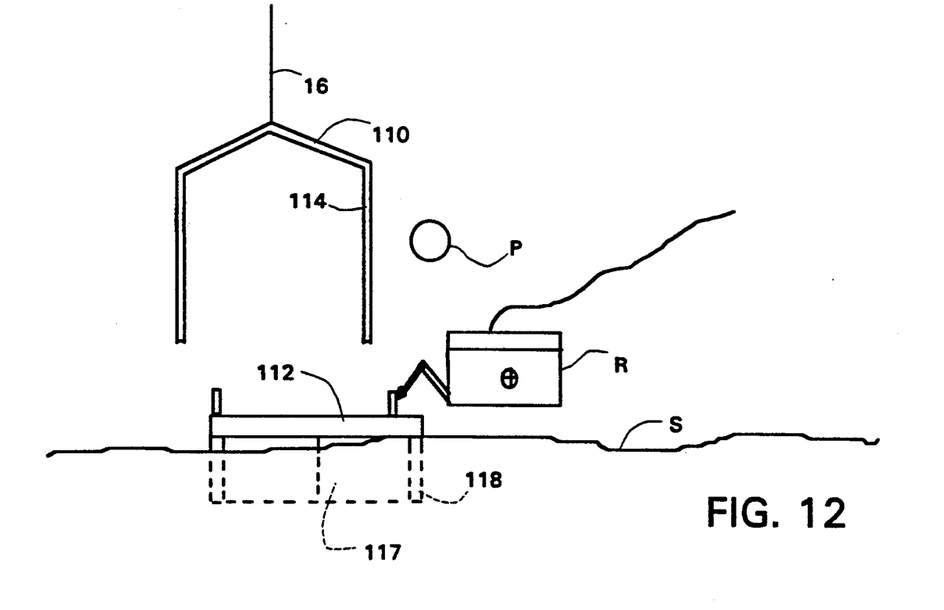

Referring now to FIG. 12, the pallet 112 has been placed on the seabed S. The pallet brace members 117 and the pallet legs 118 are embedded in the soft seabed to the depth necessary to support pallet 112 and maintain it in the horizontal position. Once proper placement of the portion 110 on the seabed S has been verified by the ROV R, the ROV R is used to disconnect the pallet alignment member 114 from the pallet 112. The pallet alignment member 114 is then returned to the surface by means of the deployment cable 16. The removable pallet alignment member 114 reduces the potential for damage to the pipeline P should the pedestal shift after the grout is set.

Figure 13:
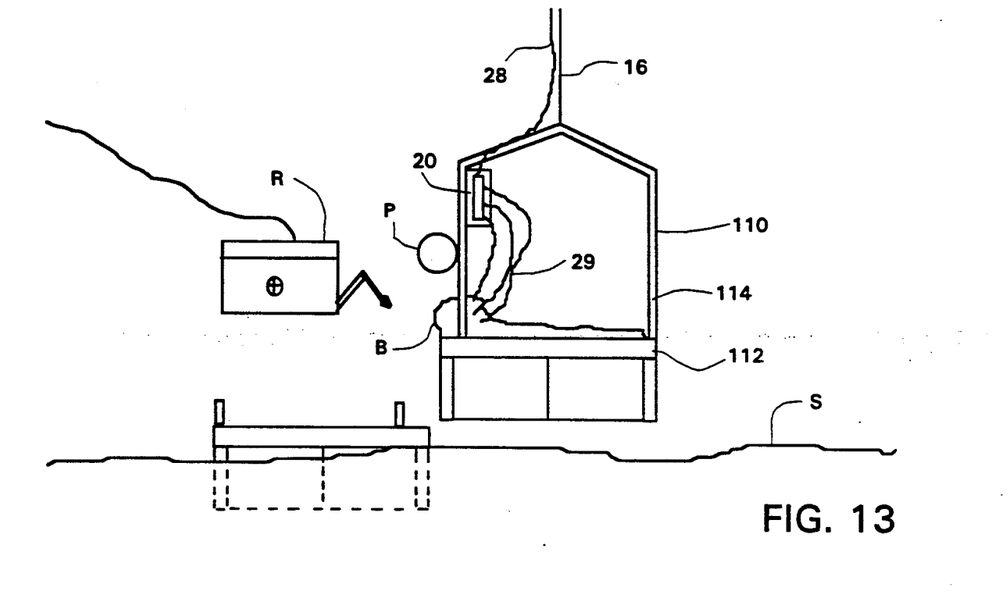

Referring now to FIG. 13, a second grout bag deployment pallet portion 110 is lowered to the seabed S by means of the deployment cable 16. This second grout bag deployment pallet portion 110 carries a grout bag B attached to pallet 112 and a grout bag deployment manifold assembly 20 attached to pallet alignment member 114. A grout supply conduit 28 is attached to a grout supply at the surface and to the grout bag deployment manifold assembly 20. Grout injection conduits 29 connect the grout bag deployment manifold assembly 20 with the various compartments of the grout bag B. Again, the pallet alignment member 114 is registered with the pipeline P during deployment. Preferably the portions 110 are aligned so that two legs of the pallet alignment member 114 are contacted with the pipeline P.

Figure 14:
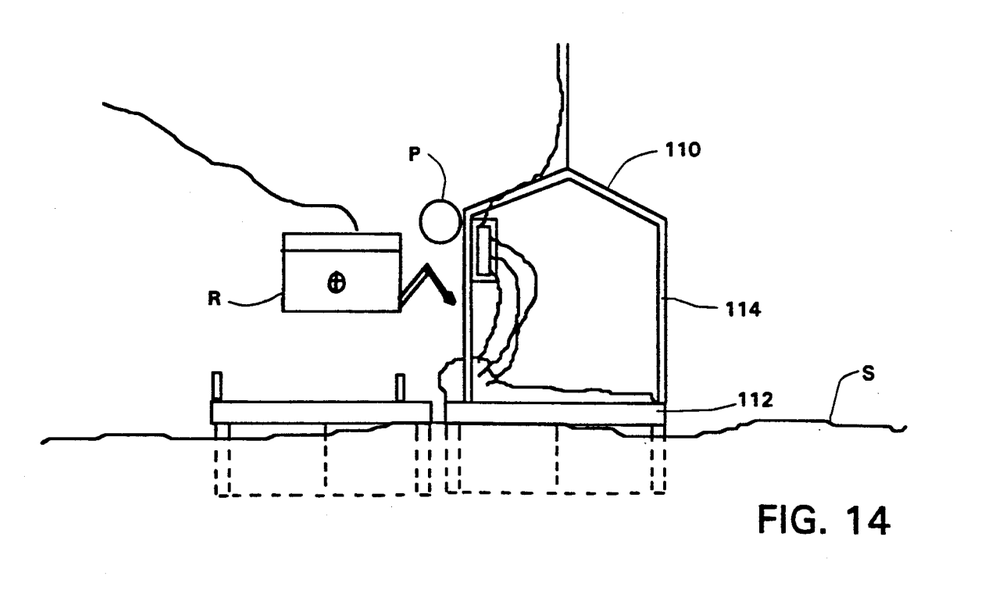

Referring now to FIG. 14, the portion 110 has been placed on the seabed S adjacent to the pipeline P. Proper placement of the portion 110 has been insured by abutting the pallet alignment member 114 with the pipeline P. Proper placement is verified by means of the ROV R.

Figure 15:
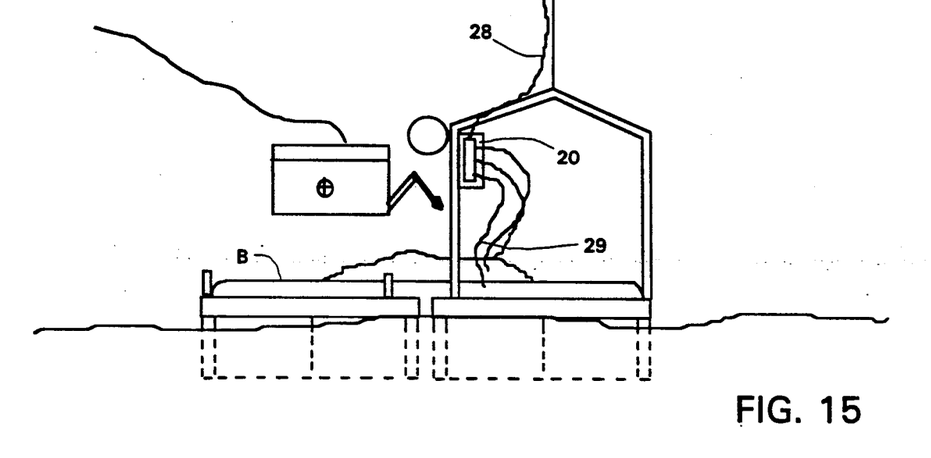

Referring now to FIG. 15, the ROV R has unfolded or deployed the grout bag B. Filling of the grout bag B is begun by filling the base compartment with grout by means of the grout supply conduit 28, the grout bag deployment manifold assembly 20, and the grout injection conduit 29 as discussed above.

Figure 16:
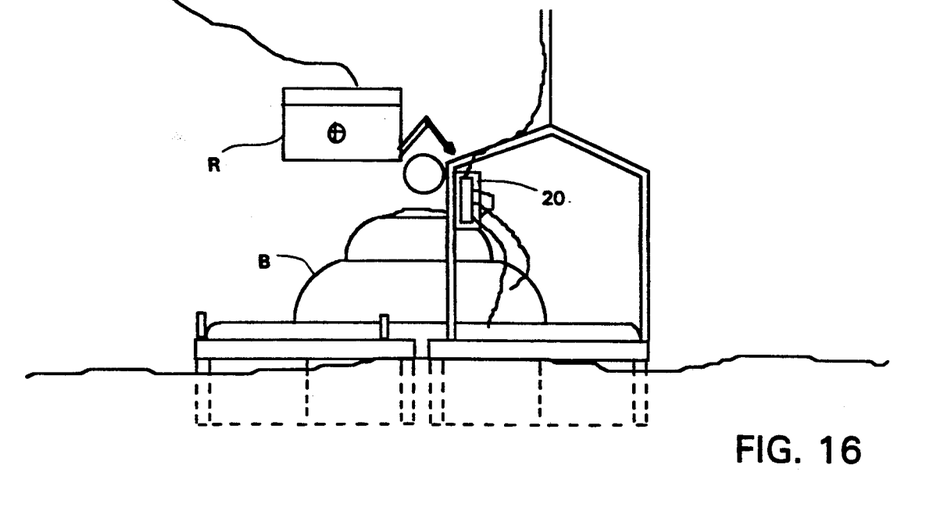

Referring now to FIG. 16, deployment of the grout bag B is continued under the supervision of the ROV R. The compartments of the grout bag B are filled in succession by means of manipulation of the grout bag deployment manifold assembly 20 by the ROV R as discussed above.

Figure 17:
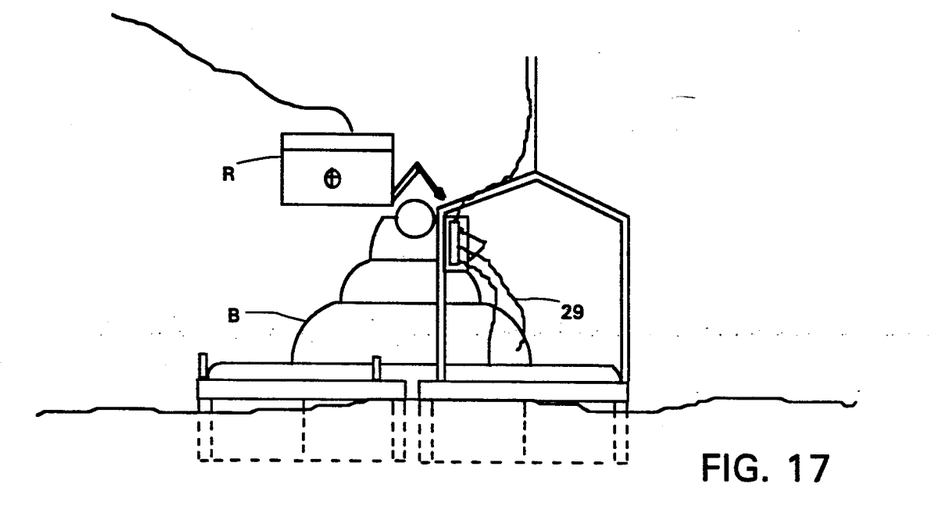

Referring now to FIG. 17, filling of the grout bag B has been completed and proper deployment is visually verified by means of the ROV R. Again note that the recessed center of the grout bag B is properly aligned with the pipeline P.

Figure 18:
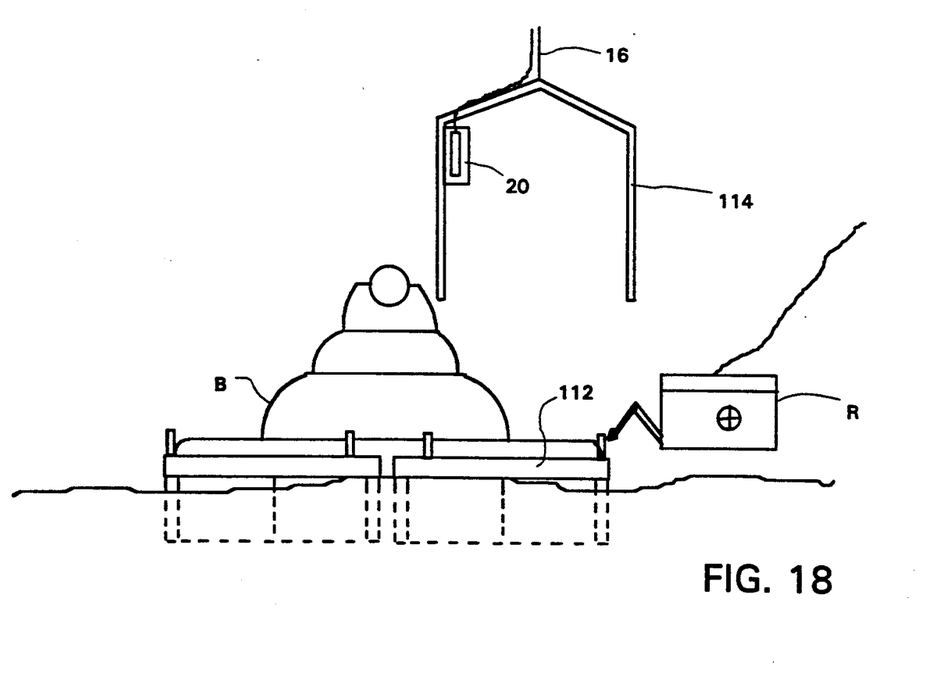

Referring now to FIG. 18, the ROV R is used to disconnect the pallet alignment member 114 from the pallet 112. The grout injection conduits 29 are also disconnected from the grout bag deployment manifold assembly 20 by means of the ROV R. The pallet alignment member 114 is then returned to the surface by means of the deployment cable 16. The deployment of the grout bag B is then complete, no pillow bag being utilized in the embodiment illustrated in FIGS. 11 through 18.

While presently preferred embodiments of the invention have been given for the purpose of disclosure, numerous changes in the details of construction and arrangement of parts will be readily apparent to those skilled in the art and are encompassed within the spirit of the invention and the scope of the appended claims.

We claim:

1. An apparatus for placement and deployment of a support for structures on a surface, the support formed by grout provided into a foldable grout bag having a place for alignment with the structure, the apparatus comprising:

planar pallet means for securing the folded grout bag during placement of the apparatus; and alignment means attached to said pallet means for positioning said pallet means relative to said structure without attachment of said alignment means to said structure, wherein said alignment means is formed so that when said alignment means is in contact with said structure, the alignment place of the grout bag is in alignment with said structure, wherein said pallet means is adapted to rest on said surface when said alignment means is in contact with said structure and the grout bag is folded.

2. The apparatus of claim 1, wherein said pallet means comprises:

a generally planar top surface for receiving said grout bag; and an angled base means, provided generally to be parallel with the surface on which said pallet means will rest; and rigid connection means between said top surface and said base means, said connection means adapted to align said top surface generally horizontal when said base means is resting on the surface.

3. The apparatus of claim 2, wherein:

said pallet means is constructed of steel beams and channels;

said top surface is constructed of expanded steel grating; and said base means is constructed of steel beams, channels, pipe, and plate.

4. The apparatus of claim 1, wherein said alignment means comprises:
first and second members for contacting the structure, said first and second members projecting substantially normal from said pallet means, wherein said first and second members are substantially straight, are separated from each other by a distance approximately equal to the length of said grout bag, and we positioned on said pallet means so that when said first and second members are in contact with said structure, the alignment place of the grout bag is in alignment with said structure.

5. The apparatus of claim 4, wherein said projecting members are removably connected to said pallet means.

6. The apparatus of claim 4, wherein said alignment means further comprises:
means for connecting the ends of said first and second projecting members away from said pallet; and
means connected to said projecting member connecting means for receiving a cable.

7. An apparatus for placement and deployment of a support for structures on a surface, the support formed by grout provided into a foldable multi-compartment grout bag having a place for alignment with the structure, the apparatus comprising:
planar pallet means for securing the folded grout bag during placement of the apparatus;
alignment means attached to said pallet means for positioning said pallet means relative to said structure, wherein said alignment means is formed so that when said alignment means is in contact with said structure, the alignment place of the grout bag is in alignment with said structure; and
deployment means for sequentially providing grout to the compartments of multi-compartment grout bags including:
manifold means including an inlet port and a plurality of outlet ports;
connection means for providing grout from a grout source conduit to the inlet port of said manifold means;
a plurality of valve means, each operably connected to an outlet port of said manifold means and capable of controlling the flow of grout through said outlet port; and
a plurality of conduit means, each operably connected to one of said valve means and to a compartment of said grout bag.

8. The apparatus of claim 7, wherein said manifold means further includes a bypass port, the apparatus further comprising a valve means operably connected to said manifold bypass port and capable of controlling the flow of grout through said bypass port.

* * * * *